US008516876B2

(12) United States Patent
Gilardi

(10) Patent No.: US 8,516,876 B2
(45) Date of Patent: Aug. 27, 2013

(54) METHOD OF ADJUSTING AN APPARATUS COMPRISING A FLEXIBLE TUBE PRE-TENSIONED WITH A LIQUID AND CONNECTED TO A PRESSURE SENSOR

(75) Inventor: Enrico Piero Gilardi, Robbio (IT)

(73) Assignee: Luca Romelli, Montagnola (CH)

( * ) Notice: Subject to any disclaimer, the term of this patent is extended or adjusted under 35 U.S.C. 154(b) by 471 days.

(21) Appl. No.: 12/797,319

(22) Filed: Jun. 9, 2010

(65) Prior Publication Data
US 2011/0005297 A1    Jan. 13, 2011

(30) Foreign Application Priority Data
Jun. 10, 2009  (CH) ...................................... 0891/09

(51) Int. Cl.
*G01L 27/00*        (2006.01)

(52) U.S. Cl.
USPC ................ 73/1.57; 73/708; 74/484 R; 74/552

(58) Field of Classification Search
USPC ........... 73/1.57–1.73, 708, 732–743; 74/552, 74/558; 180/271–273
See application file for complete search history.

(56) References Cited

U.S. PATENT DOCUMENTS

| 3,884,500 | A | * | 5/1975 | Wagner | 280/741 |
| 6,021,863 | A | * | 2/2000 | Stanley | 180/273 |
| 6,058,341 | A | * | 5/2000 | Myers et al. | 701/45 |
| 6,101,436 | A | * | 8/2000 | Fortune et al. | 701/45 |
| 7,954,399 | B2 | * | 6/2011 | Rubboli | 74/552 |
| 2001/0025624 | A1 | * | 10/2001 | Kramer | 123/396 |
| 2004/0025624 | A1 | * | 2/2004 | Kreuzer | 74/552 |
| 2011/0098157 | A1 | * | 4/2011 | Whalen et al. | 482/52 |

FOREIGN PATENT DOCUMENTS

| EP | 1 216 911 | 6/2002 |
| EP | 1 860 000 | 11/2007 |
| EP | 1 621 442 | 5/2008 |

* cited by examiner

*Primary Examiner* — Hezron E Williams
*Assistant Examiner* — Hoang Nguyen
(74) *Attorney, Agent, or Firm* — Greenblum & Bernstein, P.L.C.

(57) ABSTRACT

Method for one of adjusting (taring) or re-calibrating an apparatus that includes a liquid-filled previously pressurized flexible tube that is closed at one end and is connected to a pressure sensor at an other end. Method includes activating predetermined controlling functions by establishing a differential of an external pressure exerted onto the tube by a person and a pressure prevailing in the previously pressurized tube. In establishing the differential, the method includes taking into account variations of the pressure prevailing in the previously pressurized tube, when no external pressure is being exerted on the tube by the person, due to at least one variable external ambient parameter.

12 Claims, No Drawings

METHOD OF ADJUSTING AN APPARATUS COMPRISING A FLEXIBLE TUBE PRE-TENSIONED WITH A LIQUID AND CONNECTED TO A PRESSURE SENSOR

CROSS-REFERENCE TO RELATED APPLICATIONS

The present application claims priority under 35 U.S.C. §119 of Swiss Patent Application No. 00891/09 filed Jun. 10, 2009, the disclosure of which is expressly incorporated by reference herein in its entirety.

BACKGROUND OF THE INVENTION

1. Field of the Invention

The present invention concerns a method of adjusting (taring) or re-calibrating, respectively, an apparatus having a flexible pre-tensioned liquid-filled tube, sealed at one of its ends and connected to a pressure sensor at its other end. A differential of an external pressure exerted onto the tube by a person and a previous pressure prevailing in the tube is uses for activating predetermined controlling functions 2. Discussion of Background Information Application of flexible tubes of generally described above are known from the patent literature that includes: EP 1 216 911, EP-1621442 as well as the Swiss Patent Application Nr. 0952/07 filed on Jun. 14, 2007.

The above-noted apparatus has been utilized in combination with the steering mechanism of self-propelling vehicles (e.g., a steering wheel of an automobile, a handlebar of a motorcycle, etc.) and/or as a sensor incorporated into a seat of a vehicle. The first mentioned case makes use of the instinctive reaction of the driver in the event of stress situation such as an unexpected appearance of an obstacle that requires immediate braking action, and/or the reaction to an optical or acoustic signal. In this regard, the instinctive grasping grip on the steering wheel or on the handle bar is effected by the driver within a very short time span, but without activating the acoustic alarm signal device arranged at the centre of the steering wheel, e.g., the vehicle horn, which can only be reached slowly and which might cause injuries to the hand, e.g., in the event the air bag pops up. In the second mentioned case, reliable detection of the presence of a person (children, adults, etc.) on the passenger seat and/or measuring of the person's body weight in the seat is achieved in order to control activation of the air bag associated with the seat. In this way, in case of an accident, the intensity of the air bag blowing-up can be adapted in such a manner that un-necessary activation of the air bag is avoided and body injuries can be caused by the popping of the air bag can be limited, even if the air bag in many cases can save the lives of persons involved in an accident. Statistics prove that air bags popping indiscriminately can cause serious injuries to, e.g., children, people wearing glasses, etc. Thus, it is important that such an event can be advantageously controlled, even if it occurs very rarely.

SUMMARY OF THE INVENTION

Practical experience has shown that through the use of flexible tubes connected to a pressure gauge in order to fulfill the goals mentioned above and/or in accordance with the known patent literature, steering mechanisms that are reliable and cost-efficient can be achieved. However, these uses still present a not negligible disadvantage, i.e., effectiveness depends on or can be adversely affected by external conditions under which the apparatus is to function properly. In particular, climate conditions (e.g., temperatures, atmospheric pressure, etc.) under which the vehicle is operated can influence the initial inside pressure in the liquid-filled tube, and, therefore, affect the pressure differential detected from the pressure the driver exerts due to the reaction of his hands onto the steering mechanism, or caused by the person sitting on the seat. If the external temperature and pressure conditions change, the initial base pressure values for the flexible tube can also change, such that the predetermined pressure differential may no longer be applicable to the desired application of the apparatus or may no longer be determined. As a result, the desired activation of devices in reaction to grasping grip onto the steering wheel or to the weight in the automobile seat may not occur. Thus, one is confronted with a faulty measurement, which can eventually result in considerable discrepancies. To be considered is/are the influence(s) of, e.g., heat increases onto the elastic properties of a flexible tube and/or the decrease of the atmospheric pressure at high altitudes (according to the barometric altitude equation).

Thus, embodiments of the present invention eliminate the above-noted insecurity through a method of adjusting (taring) or recalibrating, respectively, the apparatus, which includes a flexible tube permitting effective elimination of the influence of changes in one or more external ambient parameters onto the operation of the apparatus.

According to embodiments, a method of adjusting (taring) or re-calibrating an apparatus that includes a previously pressurized flexible tube, i.e., a tube pressurized prior to use. The method includes establishing a differential between an external pressure exerted onto the tube by a person and a previous pressure prevailing in the previously pressurized tube. The establishing of the differential includes taking into account variations of a pressure prevailing in the previously pressurized tube due to one or more variable external ambient parameters without the external pressure being exerted.

The basic idea of the present invention includes that, in determining the pressure exerted onto the tube from the outside by a person relative to the pressure prevailing in the previously pressurized tube, the changes of the internal pressure due to changes in one or a plurality of ambient parameters are duly taken into account. Such variable ambient parameters can be, e.g., the ambient atmospheric pressure and/or the ambient temperature, and when either or both of these factors undergo changes, changes in the pressure prevailing inside the previously pressurized tube will result. This prevailing pressure represents the reference value for assessing the pressure change due to the pressures exerted onto the tube from the outside, which is assessed for activating the functions for which the apparatus is conceived.

In particular embodiments, the external pressure acting on the flexible tube is released at a frequency, the intervals of which are shorter than the time span during which changes of the ambient conditions occur, that entails considerable changes in the initial base value (also referred to herein as reference value or taring value). In accordance with a non-limiting example of this embodiment, the liquid-filled flexible tube can be utilized in a steering mechanism of a vehicle (steering wheel or handle bar). Accordingly, the pressure exerted onto the tube frequently and repeatedly is released much earlier than considerable changes of the ambient conditions (temperature, ambient air pressure) can make themselves felt.

In another embodiments, in which the pressure exerted onto the flexible tube is released less often, the interval between a pressure release and a following exertion of pressure is so extended that, during this time span, changes in the ambient conditions (temperature and ambient air pressure) make themselves felt in such a manner that the base value (or taring value) of the pressure prevailing in the tube, when it is free of the external pressures exerted onto it, is changed. In a non-limiting example of this embodiment, the liquid-filled flexible tube can be used to establish the weight of a person sitting on the seat of an automobile. In such embodiments, the person will generally be sitting in the seat over an extended time span during which the ambient conditions can change considerably.

Both particular cases of application of the inventive solution are to be explained in more detail in the following description with reference to several examples of realization of the present invention.

Embodiments of the invention are directed to a method of one of adjusting (taring) or re-calibrating an apparatus that includes a liquid-filled previously pressurized flexible tube that is closed at one end and is connected to a pressure sensor at an other end. The method includes activating predetermined controlling functions by establishing a differential of an external pressure exerted onto the tube by a person and a pressure prevailing in the previously pressurized tube. In establishing the differential, the method also includes taking into account variations of the pressure prevailing in the previously pressurized tube, when no external pressure is being exerted on the tube by the person, due to at least one variable external ambient parameter.

According to embodiments, the at least one ambient parameter can be an external ambient temperature. Moreover, the at least one ambient parameter is the atmospheric air pressure.

In accordance with other embodiments of the instant invention, the external pressure exerted on the previously pressurized tube may be released frequently at intervals that are shorter than a time span over which the variations in the at least one ambient parameter are felt, and a base or reference value for the one of the adjustment (taring) or re-calibration of the pressure prevailing in the previously pressurized flexible tube without the external pressures being exerted can be provided as an average value of a predetermined number of minimum values. The average value may be continually adjusted at predetermined time intervals.

According to still other embodiments, the exerted external pressure may be released from the previously pressurized flexible tube, and, during a time span between a release of the external pressure and a next exertion of external pressure, the variations of the at least one ambient parameter can occur. The apparatus can further include an information technology control device with an on/off switch, and the method may further include activating the on/off switch; establishing a base or reference pressure value from the pressure prevailing in the previously pressured flexible tube shortly before the on/off switch is activated; providing the base or reference pressure value as an initial value for the one of the adjusting (taring) or reference value; and continually adjusting the one of the adjusting (taring) or reference value as a function of the variations of the at least one external ambient parameter. The at least one external ambient parameter can be measured with a sensor system, and the information technology control device may include software programmed to take into account the variation of the prevailing pressure in the flexible tube without the external pressure being exerted as a function of at least one of the ambient temperature and the barometric pressure.

Embodiments of the instant invention are directed to a method for one of adjusting (taring) or re-calibrating an apparatus having a liquid-filled previously pressurized flexible tube that is closed at one end and is connected to a pressure sensor at an other end. The method includes monitoring a differential between an external pressure exerted on the tube by a person and a pressure prevailing in the previously pressurized tube to activate predetermined controlling functions, and varying the monitored differential due to variations on the pressure prevailing in the previously pressurized tube based upon at least one variable external ambient parameter.

In accordance with embodiments, the pressure prevailing in the previously pressurized tube is the pressure prevailing in the previously pressurized tube when the external pressure is not exerted on the tube by the person.

According to further embodiments of the invention, the at least one variable external ambient parameter can be an external ambient temperature. Also, the at least one variable external ambient parameter may be the atmospheric air pressure.

In accordance with other embodiments, the external pressure exerted on the previously pressurized tube can be released frequently at intervals that are shorter than a time span over which the variations in the at least one ambient parameter are felt. The method can also include providing a base or reference value for the pressure prevailing in the previously pressurized flexible tube without the external pressures being exerted as an average value of a predetermined number of minimum values, and continually adjusting the average value at predetermined time intervals.

According to still other embodiments, during a time span between a release of the external pressure and a next exertion of external pressure, the variations of the at least one ambient parameter may occur.

In accordance with still yet other features of the present invention, the apparatus can further include an information technology control device with an on/off switch, and the method may further include activating the on/off switch; establishing a base or reference pressure value from the pressure prevailing in the previously pressured flexible tube shortly before the on/off switch is activated; and continually adjusting the base or reference pressure value as a function of the variations of the at least one external ambient parameter. Moreover, the at least one external ambient parameter can be measured with a sensor system, and the information technology control device may include software programmed to take into account the variation of the prevailing pressure in the flexible tube without the external pressure being exerted as a function of at least one of the ambient temperature and the barometric pressure.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention.

In particular embodiments, the apparatus can include a flexible liquid-filled and previously pressurized tube in combination with the steering mechanism (steering wheel of an automobile or handle bar of a motor cycle, etc.), which is aimed at reacting to the instinctive reactions of the driver under stress in a situation of danger or panic. In such cases, the driver grasps the steering wheel or the handle bar more or less forcefully over a shorter or longer time span, but may release his grip from time to time without applying much force and eventually, for instance on a street section free of obstacles, may release his grip entirely. In this case, the additional pressure exerted by the hand of the driver onto the previously pressurized flexible tube is released. The intervals between such pressure releases (in the order of minutes rather than seconds) are much shorter than the time span over which changes in one or more ambient parameters can develop, such as, e.g., considerable changes in ambient air temperature and/or in the ambient air pressure. In this case, for adjustment or taring, the pressure prevailing in the previously pressurized tube at the moment in time that the apparatus, including the previously pressurized tube, is activated is to be taken into account or noted, and an average value of a predetermined number of minimum pressure values is assumed as the reference or taring value of the pressure prevailing in the previously pressurized without any external pressures being exerted onto it. The average value can be adjusted after predetermined time intervals to automatically compensate for changes in the ambient parameters.

In a particular embodiment of the inventive method, in addition to a sensor, which continuously measures the pressure prevailing inside the flexible previously pressurized tube, an information technology device is provided with appropriate software for establishing the average value of the pressure measured in the tube when external pressures are not being exerted onto it and for adjusting this average value after the predetermined time intervals have elapsed. As suitable software for performing the above operations can be designed by any information technology specialist, further explanations can be dispensed with here. However, in this example it is noted that adjustment or re-calibration of the apparatus comprising a flexible tube can be effected after short time spans, and it is understood that the external pressure exerted onto the tube by the driver is released after time intervals shorter than the time span required for considerable changes in ambient parameters to manifest them. Also, changes are taken into account for ensuring that the safety device comprising the flexible previously pressurized tube functions efficiently, as it adjusts itself to long term variations in the ambient parameters. Owing to the fact that the reference or taring value is continually established as the average value of a predetermined number of minimum pressure values in the tube without external pressures being exerted onto it and the reference value is continually adjusted after predetermined time intervals elapse. This type of application of the method of adjusting or re-calibrating, respectively, according to the embodiments of present invention permits its application even if the pressure exerted onto the flexible previously pressurized tube by the driver varies continually, e.g., in the case of a driver who grasps the steering wheel with one or both hands, or continually varies the griping pressure exerted onto the steering wheel or onto the handle bar. In such cases, the aim is to correctly distinguish the pressure exerted by the driver in case of a panic reaction at any moment in time, independently of the more or less slow variations in ambient parameters, e.g., the case of a steering wheel overheated due to excessive exposure to sunshine. The continuous adjustment or re-calibration, respectively, of the base pressure value in the tube in the absence of external pressures exerted onto it, thus permits the taking of real stress situations of the driver fully into account, independently of ambient conditions, which are taken care of as these determine at any moment in time the pressure prevailing in the liquid filling the tube released from pressures exerted onto it from the outside.

In other embodiments, which are somewhat different differing from the above-described embodiments, the flexible previously pressurized liquid-filled tube is provided with a pressure sensor, but the flexible previously pressurized tube is released of external pressures exerted onto only rarely, such that the apparatus must function reliably at the start of the operation. An application typical for this type case can be, e.g., for checking whether a person is sitting on a seat of an automobile and/or determining the weight of this person. This application of the flexible tube also is known according to the state of the art, e.g. from the EP A-07 405 148.3 filed in Switzerland on May 23, 2006, which is published as EP 1 860 000.

In such cases, the system must remain activated even if the engine is stopped, because the determination of the person must activated or functional from the very moment the person sits down on the seat, so that the safety function (e.g., adapting the intensity of the air bag popping to the weight of the person sitting on the seat) is ensured anytime and in all situations. For this purpose, the method provides a determination of a base pressure value prevailing in the flexible tube using an additional On/Off switch permitting exact measurement of the pressure prevailing in the tube just a moment before the sensor is activated, i.e., just a moment before the person sits down on the seat. This base pressure, determined while the seat was empty, can be continually adjusted using a suitable information technology device, the variations in the ambient conditions (barometric pressure, temperatures, etc.) can be taken into account and continually measured using appropriate pressure and temperature sensors. As the room temperature (which in a closed automobile exposed to the sun may go up to, e.g., 60° C. and more) and the barometric pressure (e.g., from sea level up to 3000 meters or more above sea level) may vary considerably, and thus can considerably influence the base pressure value prevailing in the flexible tube free of external pressure exerted onto it (i.e., while the seat was empty), it is indispensable that the information technology control device is adjusted or re-calibrated with respect to temperature as well as to barometric pressure. This can be effected in that the diagrams of the pressure as a function of the ambient temperature and the pressure in the tube as a function of the barometric pressure respectively, are incorporated in the software of the information technology device. The diagrams can be previously experimentally established. Thus, the liquid-filled tube flexible tube is continually adjusted or re-calibrated, such that variations of one or more ambient parameters are taken into account so that at any moment in time the correct weight value of the person sitting on the automobile seat may be established independently of changes in the ambient conditions to which the vehicle is exposed.

The On/Off switch mentioned is generally used, and can be solely used, for detecting the presence of a person on the seat. Thus, the switch can be activated at low weights (of just a few kg), and can transmit a signal to the information technology device, that from this moment on the pressure prevailing in the tube free of external pressure exerted onto it—as a function of the temperature and the ambient air pressure—represents the base reference value for the adjustment or the re-calibration, respectively. Based on this, the software of the information technology device can then determine the exact weight value of the person sitting on the seat, regardless of how large the variations in the ambient parameters are (e.g., the temperature can change within a few minutes from 60° C. to 20° C.).

The advantage of the method of adjusting (taring) or re-calibrating, respectively, according to the present invention is seen in that a system for measuring the pressure using a liquid-filled previously pressurized flexible tube can be utilized, which is of simple design, reliable and cost-efficient, regardless of external influences which could negatively affect exact and reliable function, the system thus being feasible for a larger field of applications.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method of one of adjusting (taring) or re-calibrating an apparatus that includes a liquid-filled previously pressurized flexible tube that is closed at one end and is connected to a pressure sensor at an other end, the method comprising:
    activating predetermined controlling functions by establishing a differential of an external pressure exerted onto the tube by a person and a pressure prevailing in the previously pressurized tube; and
    in establishing the differential, taking into account variations of the pressure prevailing in the previously pressurized tube, when no external pressure is being exerted on the tube by the person, due to at least one variable external ambient parameter,
    wherein the external pressure exerted on the previously pressurized tube is released frequently at intervals that are shorter than a time span over which the variations in the at least one ambient parameter are felt,
    wherein a base or reference value for the one of the adjustment (taring) or re-calibration of the pressure prevailing in the previously pressurized flexible tube without the external pressures being exerted is provided as an average value of a predetermined number of minimum values, and
    wherein the average value is continually adjusted at predetermined time intervals.

2. The method in accordance with claim 1, wherein the at least one ambient parameter is an external ambient temperature.

3. The method in accordance with claim 1, wherein the at least one ambient parameter is the atmospheric air pressure.

4. The method in accordance with claim 1, wherein the exerted external pressure is released from the previously pressurized flexible tube,
    wherein, during a time span between a release of the external pressure and a next exertion of external pressure, the variations of the at least one ambient parameter occur; and
    wherein the apparatus further includes an information technology control device with an on/off switch, and the method further comprises activating the on/off switch; establishing a base or reference pressure value from the pressure prevailing in the previously pressured flexible tube shortly before the on/off switch is activated; providing the base or reference pressure value as an initial value for the one of the adjusting (taring) or reference value; and continually adjusting the one of the adjusting (taring) or reference value as a function of the variations of the at least one external ambient parameter,
    wherein the at least one external ambient parameter is measured with a sensor system, and the information technology control device includes software programmed to take into account the variation of the prevailing pressure in the flexible tube without the external pressure being exerted as a function of at least one of the ambient temperature and the barometric pressure.

5. A method for one of adjusting (taring) or re-calibrating an apparatus having a liquid-filled previously pressurized flexible tube that is closed at one end and is connected to a pressure sensor at an other end, the method comprising:
    monitoring a differential between an external pressure exerted on the tube by a person and a pressure prevailing in the previously pressurized tube to activate predetermined controlling functions; and
    varying the monitored differential due to variations on the pressure prevailing in the previously pressurized tube based upon at least one variable external ambient parameter,
    wherein the external pressure exerted on the previously pressurized tube is released frequently at intervals that are shorter than a time span over which the variations in the at least one ambient parameter are felt.

6. The method in accordance with claim 5, wherein the pressure prevailing in the previously pressurized tube is the pressure prevailing in the previously pressurized tube when the external pressure is not exerted on the tube by the person.

7. The method in accordance with claim 5, wherein the at least one variable external ambient parameter is an external ambient temperature.

8. The method in accordance with claim 5, wherein the at least one variable external ambient parameter is the atmospheric air pressure.

9. The method in accordance with claim 5, further comprising providing a base or reference value for the pressure prevailing in the previously pressurized flexible tube without the external pressures being exerted as an average value of a predetermined number of minimum values, and
    continually adjusting the average value at predetermined time intervals.

10. The method in accordance with claim 5, wherein, during a time span between a release of the external pressure and a next exertion of external pressure, the variations of the at least one ambient parameter occur.

11. The method in accordance with claim 5, wherein the apparatus further includes an information technology control device with an on/off switch, and the method further comprises:
    activating the on/off switch;
    establishing a base or reference pressure value from the pressure prevailing in the previously pressured flexible tube shortly before the on/off switch is activated; and
    continually adjusting the base or reference pressure value as a function of the variations of the at least one external ambient parameter.

12. The method in accordance with claim 11, wherein the at least one external ambient parameter is measured with a sensor system, and the information technology control device includes software programmed to take into account the variation of the prevailing pressure in the flexible tube without the external pressure being exerted as a function of at least one of the ambient temperature and the barometric pressure.

* * * * *